United States Patent Office 3,171,095
Patented Feb. 23, 1965

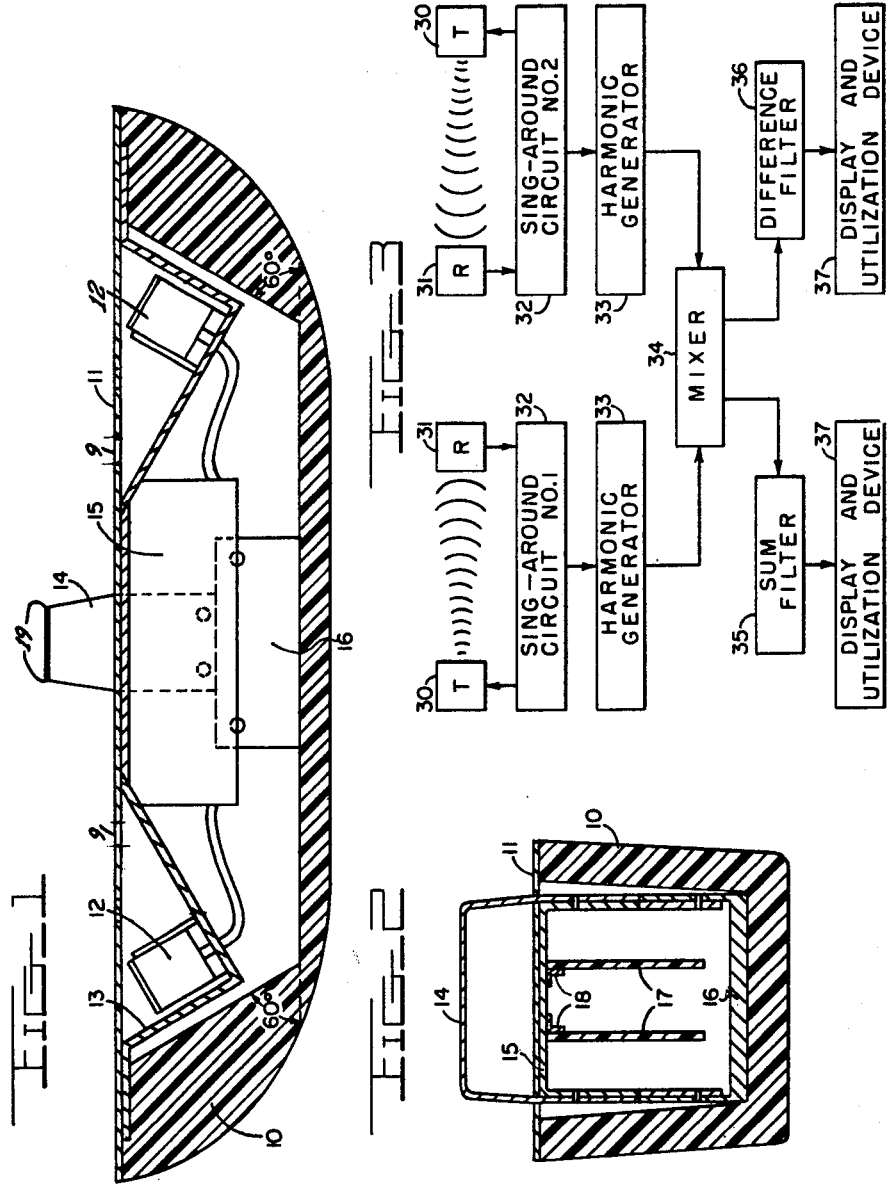

3,171,095
STREAM AND SOUND SPEED INSTRUMENT
Jervis J. Gennari, Oxon Hill, Md., assignor to the United States of America as represented by the Secretary of the Navy
Filed Sept. 10, 1962, Ser. No. 222,740
4 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

The present invention is directed to a meter for measuring the speed of sound and the speed of stream in water. More specifically the invention involves a meter designed to compensate for incidental movement of the water with respect to meter, which affects the measurement of sound velocity. The meter also measures the velocity of the water with respect to the meter, which is of collateral interest.

Many meters have been designed to measure sound velocity in water by measuring transit time from one point in the meter to another point. A typical example is a transducer which radiates and receives waves which in transit strike a normally oriented reflector. To make measurements while in motion the sound path is oriented normal to the direction of motion. If crosscurrents exist, or turbulence, the meter cannot give an accurate measurement.

The accuracy of this measurement is becoming increasingly important. In oceanography the accuracy of maps showing bottom topography is directly dependent on this measurement. As sonars become effective at longer ranges the signals remain in the water for longer periods and the need for a better figure for sound velocity becomes more acute. In fixed installations such as buoys and the like, measurement of fluid velocity in addition to the velocity of sound in the fluid can supply valuable information about tides and currents. On ships and other craft this additional measurement can be used as an aid to navigation, since it is a function of the ship's velocity.

An object of the invention is, therefore, to provide a meter for accurately determining the velocity of sound in a fluid medium and the velocity of the medium relative to the meter, using a unique combination of readily available electronic and electromechanical elements and circuitry.

A further object of the invention is to provide a meter of the type described above which is rugged, compact, economical, and which causes a minimum disturbance of the fluid medium by its presence.

These and other objects or attendant advantages of the present invention will be best understood with reference to the following specification, taken in conjunction with the accompanying drawings wherein:

FIG. 1 shows a cutaway side view of the meter structure showing the arrangement of the various elements;

FIG. 2 shows a cutaway end view of the same structure; and

FIG. 3 shows a block diagram of the metering circuit.

Referring more specifically to FIGS. 1 and 2, a particularly useful embodiment of the invention is shown. The structure is built upon a main housing member 10 which is shaped on the order of a dugout canoe. The open top of the main housing member is covered by a cover plate 11. In use the housing member will generally be placed in a recess of the hull of a larger water craft carrying various types of sonar equipment, so that the plate 11 is flush with the outer surface of the hull.

At each end within the housing 10 there is located a sound transducer unit generally designated 12. Each of said transducer units 12 includes a transmitter 30 and a receiver 31. For the present embodiment piezoelectric crystal units were used, but magnetostrictive and other types might be employed. Each transmitter, receiver pair is mounted on a suitable mounting plate 13. Apertures 9 in plate 11 are provided so that a narrow sound beam from the transmitter in each pair emerges at a small angle with that plate. Such narrow beams are characteristic of high frequency crystals. In the present invention a crystal with a natural shock excited resonance of 3.5 megacycles was used.

A U-shaped sound reflector 14 is provided centrally of the housing to redirect the narrow sound beams back through the plate 11 at the same small angle to strike the remaining transducers which act as receivers. The reflector is provided with knife edges 19 to avoid turbulence when in motion. The reflector is mounted on a similarly oriented U-shaped channel support member 15. The legs of the channel support extend beyond those of the reflector and nest in an inverted U-shaped mounting base 16. These members are fastened to one another and the houisng by means of screws, rivets or other suitable fasteners. A pair of printed circuit boards 17 containing the necessary electronic circuitry for the transducers are mounted on the channel support member 15 using conventional brackets 18.

A block diagram of the circuitry is shown in FIG. 3. The transmitter 30 of each of transducer units 12 is connected to the receiver 31 in the other transducer unit by means of a sing-around circuit. The sing-around circuit is a development of the National Bureau of Standards, and a more complete description may be found in the following publications; M. Greenspan and C. E. Tschiegg, Review of Scientific Instruments, vol. 28, No. 11, pp. 897–901 (1957); C. E. Tschiegg, et al., Journal of the Acoustical Society of America, vol. 31, No. 7, pp. 1038–39 (1959); and M. Greenspan and C. E. Tschiegg, Journal of Research of the National Bureau of Standards, vol. 59, No. 4, pp. 249–254 (1957). Essentially this circuit is a pulsed oscillator, as for example a blocking oscillator, which is triggered by the receiver to shock excite the crystal. The frequency of the oscillator thus depends on the velocity of propagation over the sound path between the transmitter and receiver. A portion of the signal in each sing-around circuit is tapped off and fed to a harmonic generator. The two signals thus obtained are fed to at least one mixer 34 where the sum and difference, if any, of the two signals is developed. The resultant signals are fed through sum and difference filters 35 and 36, respectively, to a display and/or utilization device 37.

The signal from the sum filter is dependent only on the velocity of sound in the medium surrounding the meter. The difference frequency on the other hand, depends only on relative motion between the meter and the medium. These quantities may be displayed visually, recorded, or converted to suitable analogs for automatically compensating pulse echo sonar systems. Using a spacing of 9.746 inches a sing-around or oscillation period of 162.42 microseconds is obtained. Using frequency tripling in the harmonic generators stream speeds of 0–40 knots can be measured with a resolution of 0.08 knot.

The unit is easily fashioned from noncorrosive materials such as stainless steel, brass for the metallic members and plastics such as polyethylene or polyvinyl chloride. The electrical portions are preferably made from solid state amplifiers and similar electrical elements, which are least affected by ambient pressures. These elements may further be encapsulated in an epoxy resin or the like for further protection from the electrical and chemical effects of seawater. The meter may carry its own energy source, in the form of batteries associated with the electrical circuitry, or leads may be brought out through the housing to an external source.

Obviously many modifications and variations of the present invention are possible in the light of the above teachings. It is therefore to be understood that within the scope of the appended claims the invention may be practiced otherwise than as specifically described.

What is claimed is:

1. A meter for measuring the speed of sound in a fluid and the relative flow of said fluid with respect to said meter comprising:
    (a) a streamlined housing having a central compartment and two end compartments,
    (b) a first sound transducer unit in one of said end compartments and a second sound transducer unit in the other of said end compartments, each of said transducer units including a transmitter and a receiver,
    (c) a U-shaped reflector plate mounted midway along and externally of said housing,
    (d) a cover plate overlying and closing said compartments and having a pair of apertures therein, each of said apertures lying in a plane through said reflector and one of said transducer units,
    (e) electronic circuit means mounted within said central compartment and including first and second oscillators having feedback paths which include first and second parallel acoustic delay lines through said fluid, and
    (f) mixer means for combining the signals from said oscillators to produce the sum and difference of their frequencies.

2. A meter according to claim 1 in which the parallel acoustic delay lines include the transmitter of one of said transducer units and the receiver of the other of said transducer units and follow a path defined by one of said transmitters, one of said apertures, the reflector plate, the other of said apertures, and one of said receivers.

3. A meter according to claim 2 in which the parallel delay lines propagate sound pulses in opposite directions through said fluid.

4. A meter to be mounted in a recess on the hull of a water vessel for determining the speed of sound in the fluid and the relative flow of said fluid with respect to said meter comprising:
    (a) a streamlined housing having a central compartment and end compartments on each side of said central compartment, said housing being contoured for reception by a hull recess,
    (b) a first sound transducer unit in one of said end compartments and a second sound transducer unit in the other of said end compartments,
    (c) a reflector plate having a turbulence reducing knife edge thereon mounted midway along and externally of said housing,
    (d) a cover plate between said housing and said reflector plate lying in the plane of said hull and substantially closing said compartments, said cover plate having a pair of apertures therethrough, and
    (e) electrical circuit means within said central compartment including a pair of oscillator circuits having external parallel acoustic delay lines defined by one of said transducer units, one of said apertures, said reflecting plate, the other of said apertures and the other of said transducer units, said electrical circuit means providing frequency outputs proportional to the speed of sound in the fluid and the relative flow of the fluid with respect to said meter.

References Cited by the Examiner
UNITED STATES PATENTS

| | | | |
|---|---|---|---|
| 2,515,221 | 7/50 | Henning | 340—3 X |
| 2,708,366 | 5/55 | Blocher et al. | 73——194 |
| 2,779,931 | 1/57 | Hersey | 340—3 |
| 2,826,912 | 3/58 | Kritz | 73—194 |
| 2,949,773 | 8/60 | Batchelder | 73—194 |
| 2,993,373 | 7/61 | Kritz | 73—194 |

CHESTER L. JUSTUS, *Primary Examiner.*